(12) United States Patent
Woodall et al.

(10) Patent No.: US 6,366,534 B1
(45) Date of Patent: Apr. 2, 2002

(54) UNDERWATER HIGH ENERGY ACOUSTIC COMMUNICATIONS DEVICE

(75) Inventors: Robert Woodall, Panama City Beach; Felipe Garcia, Panama City, both of FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/823,007

(22) Filed: Apr. 2, 2001

(51) Int. Cl.[7] ............................ H04B 11/00; H04R 23/00
(52) U.S. Cl. ...................... 367/145; 367/131; 181/116
(58) Field of Search ................................. 367/140, 142, 367/145, 131; 181/113, 116

(56) References Cited

U.S. PATENT DOCUMENTS 3,360,070 A * 12/1967 Cholet et al. ............... 367/145
4,466,083 A * 8/1984 Willard et al. .............. 367/175
5,175,712 A * 12/1992 Vaccaro et al. ............. 181/116

* cited by examiner

Primary Examiner—Ian J. Lobo
(74) Attorney, Agent, or Firm—Harvey A. Gilbert; Donald G. Peck

(57) ABSTRACT

An underwater high energy acoustic communications device has inner shell-like structure having an outer surface connected to first ends of tuning springs and outer shell-like structure having an inner surface connected to second ends of the tuning springs to concentrically locate and space the inner and outer structures apart. Explosive units mounted on the inner surface of the outer structure each includes an explosive squib, rigid tube, and projectile. A micro-controller feeds firing signals over electrical leads to the explosive units to detonate them and fire their projectiles to strike the inner structure that emits ringing high-energy broadband acoustic signals that are propagated into surrounding seawater. A transducer connected to the micro controller receives acoustic signals from a remote source to activate the micro-controller to generates preprogrammed sequences of firing signals to propagate coded messages by the high-energy broadband, acoustic signals.

24 Claims, 1 Drawing Sheet

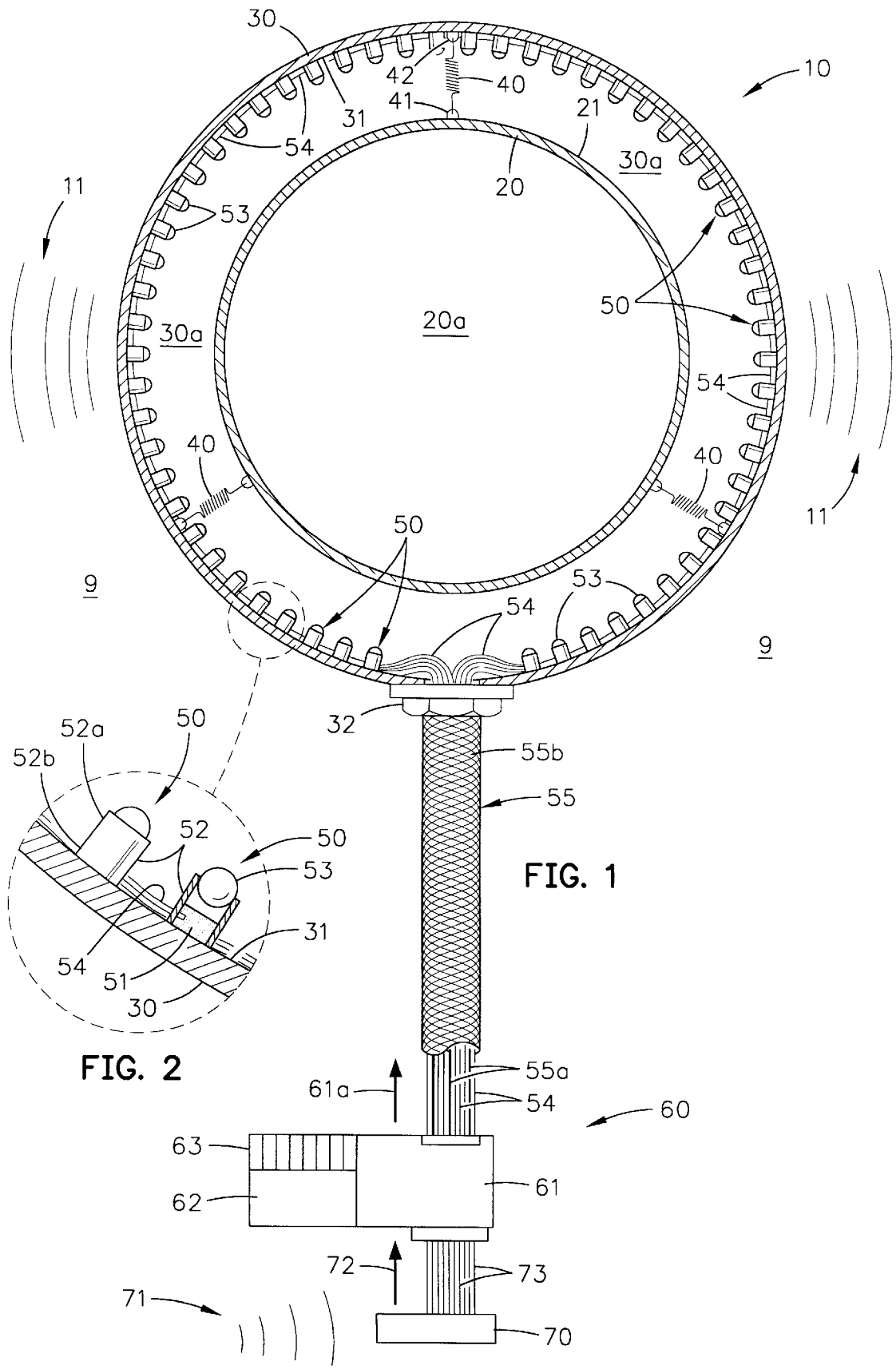

UNDERWATER HIGH ENERGY ACOUSTIC COMMUNICATIONS DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to underwater communications devices transmitting high levels of energy. More particularly, the underwater communications devices of this invention uses explosives to transmit coded high energy, broadband acoustic signals from remote unattended locations in response to interrogation signals.

Current methods of communicating signals underwater make use of piezoelectric and other electromechanical transducers to transmit acoustic energy into the water and have it propagate some distance to an in-water receiving transducer. The receiving transducer converts the received acoustic energy into electrical signals that are deciphered and translated into readable messages. Drawbacks inherent to the use of acoustic energy transmitted through the sea are many. Environmental factors all contribute to distort, degrade, mask, or inhibit the acoustic transmission of acoustic energy from the source to the receiver. Often traditional transducers emit acoustic energy in only a narrow band of wavelengths and, as such, are prone to signal deterioration due to biota absorbing these frequencies, thermoclines distorting their translation, etc. To overcome these environmental factors acoustic-transmitting arrays of great size requiring massive amounts of power and large electrical plants have been introduced. Typical of such systems are those found integrated aboard modern navy vessels. Unfortunately, these systems are very large and expensive and are not readily adaptable to being made constituents of deployable ordnance. Miniaturization of traditional transducer systems for incorporation into deployable ordnance always comes at a requisite reduction in useable available electrical power and, consequently, in the ability to communicate effectively over long ranges.

Thus, in accordance with this inventive concept, a need has been recognized in the state of the art for an in-water device used to report information to command platforms with high reliability of hearing the signal emitted from the device to allow responsive decisions to be made regarding movement and transit of maritime vessels.

SUMMARY OF THE INVENTION

The present invention provides an underwater high energy acoustic communications device. An inner shell-like structure has an outer surface connected to first ends of a plurality of tuning springs. An outer shell-like structure has an inner surface connected to second ends of the tuning springs to concentrically locate and space the inner and outer structures in a spaced-apart state of equilibrium. A plurality of explosive units are mounted on the inner surface of the outer structure. Each of the explosive units includes an explosive squib, a rigid tube, and a projectile. Firing signals from a micro-controller are fed over electrical leads to designated ones of the squibs of the explosive units to detonate them and fire their interconnected projectiles to strike the inner structure that emits ringing high-energy broadband acoustic signals that are propagated into surrounding seawater. A transducer connected to the micro controller receives specific acoustic signals from a remote source to produce representative signals that are connected to the microcontroller which in turn generates preprogrammed sequences of firing signals so that the explosive squibs are fired in varying rates to propagate various coded messages by the high-energy, broadband, acoustic signals.

An object of the invention is to provide a method of and device for producing high power communication signals from an in-water device using highly energetic explosive compounds.

Another object is to provide a method of and device for sending high power communication signals via highly energetic explosives to allow long range one-way omni-directional communications from ordnance, where size and electrical energy are limited, to a remote host platform. Another object is to provide a method of and device for using chemical energy in explosives to eliminate drawbacks associated with communication systems relying on traditional transducers.

Another object is to provide a method of and device for using explosives to provide more energy on a per unit volume and weight basis than electrical or mechanical transducer systems.

Another object is to provide a method of and device for unattended in-water high energy transmission using high energetic explosives at a remote location to accurately and acoustically report monitored information to distant command platforms to enable responsive decisions. Another object is to provide a method of and device for communicating using broadband acoustic signals significantly less affected by environmental factors influencing signal propagation than traditional electrically or mechanically driven transducer elements. These and other objects of the invention will become more readily apparent from the ensuing specification when taken in conjunction with the appended claims.

BRIEF DESCRIPTION OF THE DRAWINGS

FIG. 1 schematically represents the device of the invention shown partially in cross section using explosives to produce high power acoustic signals for long range one-way omni-directional communications.

FIG. 2 shows details of explosive units mounted on the outer sphere and aiming their projectiles in the direction of the inner sphere.

DESCRIPTION OF THE PREFERRED EMBODIMENT

Referring to the figure, the underwater high energy acoustic communications device of the invention, hereinafter referred to as HEAD 10 is deployed in seawater 9 for unattended prolonged periods of time. HEAD 10 includes two concentric spheres 20 and 30. Inner sphere 20 is shell-shaped and made from a tough, hard metal, e. g., tool steel, to generate and project acoustic information signals. Outer sphere 30 is shell-shaped and made of a tough material such as steel to provide buoyancy, withstand the rigors of long-term deployment, and survive transmission of acoustic signals. Materials for spheres 20 and 30 are selected to assure that HEAD 10 is slightly positively buoyant.

Inner and outer spheres 20 and 30 are held in a spaced-apart state of equilibrium by a set of tuning springs 40 that each have a first and second end 41 and 42 coupled to a spherically-shaped outer surface 21 of inner sphere 20 and a spherically-shaped inner surface 31 of outer sphere 30. While only three springs 40 are shown, it is understood that more of these springs 40 can be used to reach between spheres 20 and 30 along other aligned polar coordinates of spheres 20 and 30 to assure the spaced-apart state of equilibrium. Spheres 20 and 30 may be filled with a gaseous or liquid fluid 20a and 30a respectively, and these fluids may be pressurized to help bear ambient pressures.

Referring in addition to FIG. 2, inner surface 31 of outer sphere 30 mounts many rows and columns of electrically initiated explosive units 50 that may be in such numbers to nearly cover inner surface 31. Each explosive unit 50 has an explosive squib 51 in a rigid tube 52 and a projectile 53 on each tube 52. Each projectile 53 is typically a steel hard ball (spherical) although other shapes and materials could be used as well. Irrespective what shape and material is selected for projectile 53 it can be press fitted into an outer end 52a of each rigid tube 55, and each inner end 52b of each rigid tube 52 is secured to inner surface 31 of outer shell 30 so each rigid tube 52 aims its projectile 53 at inner sphere 20.

Each explosive squib 51 of each explosive unit 50 is coupled to an electrical lead 54 that extends to a cable 55. Cable 55 has many leads 54 each extending from a separate explosive squib 51 in each of all explosive units 50 mounted on inner surface 31. Cable 55 passes through a watertight fitting 32 in outer sphere 30, and optionally, cable 55 can have internal cords 55a and/or external braided covers 55b for load bearing members that are coupled to outer sphere 30 through fitting 32 and extend to an anchor (not shown). These load bearing members bear the buoyant force of spheres 20 and 30 as they hold HEAD 10 upright as shown in the figure. Leads 54 of cable 55 reach from outer sphere 30 to a common electrical network 60.

Electrical network 60 includes a micro-controller 61 connected to a battery 62 and a bank of firing capacitors 63. Micro-controller 61 can be prepackaged integrated circuitry components preprogrammed to generate separate or sequences of discreet firing signals 61a to initiate certain ones of explosive squibs 51 by firing capacitors 63. At least one hydrophone transducer 70 close to HEAD 10 receives specific acoustic signals 71 from at least one remote source (not shown) such as a remote control station or a distant source of signals of interest. Specific acoustic signals 71 produce representative signals 72 in transducer 70 that are fed over leads 73 to micro-controller 61. These representative signals 72 cause micro-controller 61 to generate preprogrammed firing signals 61a and couple them over selected ones of leads 54 of cable 55 to certain ones of explosive units 50 to initiate designated explosive squibs 51.

In operation, transducer 70 of HEAD 10 receives specific acoustic signals 71, e.g., acoustic interrogation signals from a naval craft. Specific acoustic signals 71 might be a coded request for stored information within HEAD 10 to be transmitted acoustically to a distant naval craft. Representative signals 72 are fed over leads 73 to micro-controller 61. Preprogrammed micro-controller 61 stores and recognizes the information content and instructions for action of acoustic signal 71 and sends an appropriate logic command signal to battery 62 to power up the appropriate firing capacitors in bank 63. In a preprogrammed timed sequence, micro-controller 61 activates the firing capacitors of bank 63 to discharge their energy as discreet firing signals 61a over selected ones of leads 54 to a logically determined number of explosive squibs 51 at discreetly timed intervals.

When each explosive unit 50 receives a discreet firing signal 61a its explosive squib 51 fires, or is detonated at a prescribed time to launch its projectile 53 to strike inner sphere 20 that emits, or causes emission of acoustic energy like a steel bell that has been struck. The striking of each projectile 53 onto the steel bell of inner sphere 20 creates powerful (loud), ringing, high-energy broadband, acoustic signals 11 that are propagated into surrounding seawater 9. These high-energy broadband acoustic signals 11 travel to the receiving transducer aboard the distant naval craft. By varying rates successive squibs 51 are fired, various coded messages can be reliably propagated by high-energy broadband signal 11 from HEAD 10. Springs 40 are used to separate the two spheres 20 and 30 in a state of spaced-apart equilibrium. However the spring constants of springs 40 can be changed, or varied in value, in infinite increments, to allow emission of an infinite variety of signal harmonics and spectral content of broadband signals 11 from HEAD 10. By varying springs 40 or their spring constants in each HEAD 10, each and every HEAD 10 can project different natural harmonics and spectral contents associated with its high-energy broadband ringing acoustic signals 11.

Therefore, different high-energy broadband ringing acoustic signals 11 can be differentiated from one another by remote listening devices provided with commercially available digital signal processing chips and software to make well known spectral and time domain signal analysis. Since several HEADS 10 can emit the different high-energy broadband ringing acoustic signals 11 each having different harmonics and spectral content, multiple HEADS 10 can be emitting to communicate at the same time and still be discernible from one another at the receiving end. Additionally, projectiles 53 can be made from different materials to yield different and distinguishable harmonics in order to convey different messages or propagate specific mediums in a preferred manner when they impact the inner sphere. Knowing in advance the harmonic and spectral content pattern of each HEAD 10 of interest ensures the validity of the transmitted/coded information at the remote command platform. Varying the time between firings of explosive units and the number of total firings per each message permits a great deal of coded information to be transmitted via each and all of broadband signals 11.

HEAD 10 provides high power broadband signals 11 in water using highly energetic explosive compounds that provide more energy on a per unit volume and weight basis than contemporary electrical or mechanical power systems. HEAD 10 assures the high energy for long range one-way omni-directional communications from a remote unattended station, where physical size and electrical energy are limited. HEAD 10 generates and transmits broadband impulse signals 11 that are significantly less affected by environmental factors influencing signal propagation than traditional electrically or mechanically driven transducer elements. Having the teachings of this invention in mind, different applications, modifications and alternate embodiments of this invention may be adapted as will be apparent to one skilled in the art to which this invention pertains. The inner and outer spheres could be made out of different materials than steel and could be made to have different thicknesses to provide for different operating depth capabilities and broadband signals 11 of different harmonic and other spectral contents. HEAD 10 is scalable and can be made in larger or smaller sizes and in a multitude of different shapes, such as using inner and outer cylindrically-shaped shells or other shapes, for examples. HEAD 10 can be adapted to seismic surveying underwater.

The disclosed components and their arrangements as disclosed herein all contribute to the novel features of this invention. HEAD 10 of this invention is an unattended, cost-effective means using explosives to reliably generate and transmit high-energy, broadband signals 11 through ambient seawater 9 in response to acoustic signals Therefore, HEAD 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. An apparatus for transmitting high-energy broadband acoustic signals underwater comprising:

an inner shell-like structure having an outer surface;

a plurality of tuning springs each having first and second ends, said tuning springs being coupled at said first ends to said outer surface of said inner structure;

an outer shell-like structure having an inner surface, said tuning springs being coupled at said second ends to said inner surface of said outer structure to concentrically locate and space said inner and outer structures apart; and a plurality of explosive units mounted on said inner surface of said outer structure.

2. An apparatus according to claim 1 further wherein said tuning springs hold said inner and outer structures in a spaced-apart state of equilibrium.

3. An apparatus according to claim 2 further wherein said inner and outer structures are made from metal and are filled with fluid.

4. An apparatus according to claim 3 further wherein said inner and outer structures are inner and outer shell-like spheres, said outer surface of said inner sphere is spherically-shaped, said inner surface of said outer sphere is spherically-shaped, and said metal is steel.

5. An apparatus according to claim 3 further wherein said inner and outer structures are inner and outer cylindrically-shaped shells.

6. An apparatus according to claim 4 wherein each of said explosive units includes an explosive squib, a rigid tube, and a projectile, said rigid tube containing said explosive squib, having an inner end mounted on said inner surface of said outer sphere, mounting said projectile on its outer end, and aiming said projectile at said inner sphere.

7. An apparatus according to claim 6 further comprising:

a micro-controller for generating firing signals; and a cable having a plurality of electrical leads coupled to said micro controller, each of said electrical leads extending to a different explosive squib of said explosive units to feed said firing signals thereto.

8. An apparatus according to claim 7 further comprising:

a battery and bank of capacitors coupled to said micro-controller to generate said firing signals.

9. An apparatus according to claim 8 further comprising;

a transducer connected to said micro controller, said transducer receiving specific acoustic signals from a remote source to produce representative signals.

10. An apparatus according to claim 9 wherein said representative signals are connected to said micro-controller to generate preprogrammed sequences of said firing signals and couple them over selected ones of said electrical leads to certain ones of said explosive units to initiate designated ones of said explosive squibs of said explosive units.

11. An apparatus according to claim 10 wherein said sequences of firing signals detonate said designated ones of said explosive squibs of said explosive units at a prescribed time to detonate and fire their interconnected projectiles to strike said inner sphere.

12. An apparatus according to claim 11 wherein striking of said inner sphere with said projectiles causes emission of acoustic energy like a struck steel bell.

13. An apparatus according to claim 12 wherein said emitted acoustic energy is ringing high-energy broadband acoustic signals propagated into surrounding seawater.

14. An apparatus according to claim 13 wherein said explosive squibs are fired in varying rates to propagate various coded messages by said high-energy, broadband, acoustic signals.

15. An apparatus according to claim 14 wherein said tuning springs have variable spring constants to allow emission of an infinite variety of signal harmonics and spectral content of said high-energy, broadband, acoustic signals.

16. An apparatus according to claim 15 wherein said cable has load bearing members coupled to said outer sphere and extending to an anchor.

17. A method of generating and transmitting high-energy, broadband, acoustic signals underwater comprising the steps of:

providing an inner shell-like structure having an outer surface;

coupling a plurality of tuning springs at a first end of each of said springs to said outer surface of said inner structure;

providing an outer shell-like structure having an inner surface;

coupling said plurality of said tuning springs at a second end of each of said springs to said inner surface of said outer structure;

concentrically locating and spacing said inner and outer structures apart; and mounting a plurality of explosive units having explosively expellable projectiles on said inner surface of said outer structure such that said projectiles, when expelled, strike said inner shell-like structure emitting high-energy, broadband acoustic signals into surrounding sea water.

18. A method according to claim 17 further comprising the steps of:

holding said inner and outer structure in a spaced-apart state of equilibrium with said tuning springs;

making said inner and outer structures from metal; and filling said inner and outer structures with fluid.

19. A method according to claim 17 wherein said step of mounting explosive units comprises the steps of:

providing an explosive squib, a rigid tube, and a projectile for each of said explosive units;

containing said explosive squib in said rigid tube;

mounting an inner end of said rigid tube on said inner surface of said outer structure, mounting said projectile in an outer end of said rigid tube; and aiming said projectile at said inner structure.

20. A method according to claim 19 further comprising the steps of:

generating firing signals in a micro-controller;

coupling said firing signals through a plurality of electrical leads connected to said micro-controller; and feeding said firing signals over electrical leads each extending to a different explosive squib of said explosive units.

21. A method according to claim 20 further comprising the steps of:
- connecting a battery and bank of capacitors to said micro-controller to generate said firing signals;
- connecting a transducer to said micro controller;
- receiving specific acoustic signals from a remote source to produce representative signals by said transducer;
- connecting said representative signals to said micro-controller to generate preprogrammed sequences of said firing signals;
- coupling said preprogrammed sequences of said firing signals over selected ones of said electrical leads to certain ones of said explosive units; and
- initiating designated ones of said explosive squibs of said explosive units with said preprogrammed sequences of said firing signals.

22. A method according to claim 21 further comprising the steps of:
- varying the firing rates of said explosive squibs; and
- propagating various coded messages in said high-energy, broadband, acoustic signals by said step of varying.

23. A method according to claim 22 further comprising the step of:
- varying the spring constants of said tuning springs to allow emission of an infinite variety of signal harmonics and spectral content of said high-energy, broadband, acoustic signals.

24. A method according to claim 22 further comprising the step of:
- fashioning said inner and outer shell-like structures in the shape of spherical shells.

* * * * *